US012792519B1

(12) United States Patent
Doddaiah et al.

(10) Patent No.: US 12,792,519 B1
(45) Date of Patent: Nov. 10, 2026

(54) MODEL SPECIFIC DISTRIBUTED DATA PREFETCHING

(71) Applicant: Dell Products L.P., Round Rock, TX (US)

(72) Inventors: Ramesh Doddaiah, Westborough, MA (US); Jonathan I. Krasner, Coventry, RI (US); Xiangping Chen, Sherborn, MA (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 19/247,719

(22) Filed: Jun. 24, 2025

(51) Int. Cl.
*G06F 12/0862* (2016.01)
*G06F 9/455* (2018.01)

(52) U.S. Cl.
CPC .......... *G06F 12/0862* (2013.01); *G06F 9/455* (2013.01); *G06F 2009/45579* (2013.01)

(58) Field of Classification Search
None
See application file for complete search history.

(56) References Cited

U.S. PATENT DOCUMENTS 11,755,534 B2 * 9/2023 Hsu .................... G06F 12/0862 707/822
2014/0297780 A1 * 10/2014 Zhou .................. H04L 67/5681 709/216
2021/0055977 A1 * 2/2021 Lisuk .................. G06F 9/45558
2023/0409487 A1 * 12/2023 Sandberg ............ G06F 12/1009
2026/0081846 A1 * 3/2026 Çomak De Cnudde .................... H04L 41/16

* cited by examiner

*Primary Examiner* — Kaushikkumar M Patel
(74) *Attorney, Agent, or Firm* — Chamberlain, Hrdlicka, White, Williams & Aughtry; Aly Z. Dossa

(57) ABSTRACT

A method for prefetching data for Input/Output (IO) requests, the method includes receiving an I/O request from a virtual machine (VM), extracting a VM-Identifier (ID) and a model ID from the I/O request to obtain a VM-ID-model ID pair, making a first determination, in response to the extracting, that data needed to service the I/O request is not in a cache, obtaining the data needed to service the I/O request, where the data is associated with a logical block address (LBA), servicing the I/O request using the obtained data, creating, creating an entry in a cache tracking data structure, where the entry specifies the VM-ID, the model ID, and the LBA, making a second determination, based on the entry, that a prefetching threshold is met for the VM-ID-model ID pair, and prefetching data starting at an LBA following the LBA to obtain perfected data.

20 Claims, 5 Drawing Sheets

MODEL SPECIFIC DISTRIBUTED DATA PREFETCHING

BACKGROUND

Machine learning workloads require efficient data retrieval for optimal performance and training efficiency. Current storage arrays cannot identify the originating machine learning model from Input/Output (I/O) requests, resulting in suboptimal data access patterns when requests from multiple models become interleaved. This problem becomes worse when multiple models run at the same time on different virtual machines using the same storage array.

BRIEF DESCRIPTION OF DRAWINGS

Certain embodiments of the disclosure will now be described with reference to the accompanying drawings. However, the accompanying drawings illustrate only certain aspects or implementations of the disclosure by way of example and are not meant to limit the scope of the claims.

DETAILED DESCRIPTION

Current storage array architectures face significant challenges when supporting machine learning model training and inference workloads. Machine learning models require rapid access to large datasets and model parameters to maintain optimal performance and minimize computational bottlenecks. Quick data retrieval is critical for these workloads, as delays in data access can significantly impact model training convergence times, inference latency, and overall system throughput. However, storage array devices receive I/O requests without identifying the originating machine learning model, preventing the implementation of model-specific performance optimizations such as targeted data prefetching. Consequently, storage performance policies can only be applied at the datastore level, affecting all virtual machines or models collectively rather than optimizing for individual workloads. The inability to differentiate I/O requests from individual machine learning processes means that sequential read patterns from a specific model may not be recognized by the storage array, as I/O requests from multiple concurrent training or inference sessions become interleaved and disrupt sequential pattern detection. Additionally, prefetch statistics are tracked per logical unit number (LUN) without distinguishing between requests from different virtual machines or models, further limiting the effectiveness of performance optimization strategies.

In general, the disclosure relates to a method for optimizing storage performance for individual machine learning models and their associated virtual machines by assigning unique identifiers to virtual machine model pairs that send frequent I/O requests and prefetching data for said pairs. The method enables storage arrays to track and differentiate between I/O requests originating from different machine learning models, allowing for model-specific performance optimizations such as targeted prefetching strategies. By maintaining metadata about the origin of I/O requests through a cache tracking data structure, the system can implement intelligent prefetching policies that improve data retrieval efficiency for machine learning workloads. Specific embodiments will now be described with reference to the accompanying figures.

Figure 1:
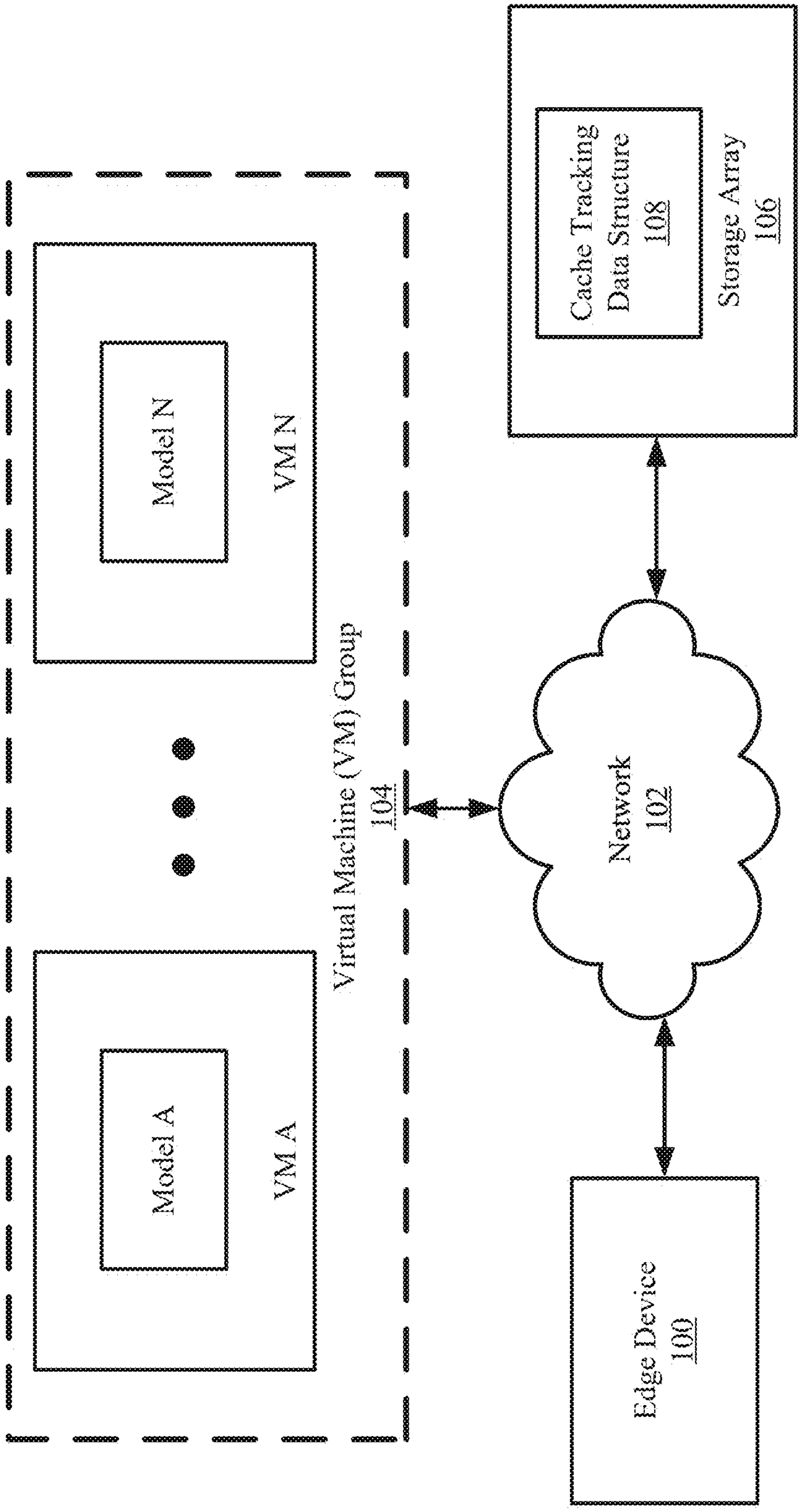
FIG. 1 shows a diagram of a system in accordance with one or more embodiments.

FIG. 1 shows a system in accordance with one or more embodiments. The system may include an edge device (100), a network (102), a virtual machine (VM) group (104), a storage array (106), and a cache tracking data structure (108). The system may include additional, fewer, and/or different components without departing from the scope of the embodiments disclosed herein. Each component may be operably/operatively connected to any of the other components via any combination of wired and/or wireless connections. Each of these system components is described below.

In one or more embodiments, the edge device (100), the VM group (104), the storage array (106), and the cache tracking data structure (108), may be operatively connected to one another through the network (102) (e.g., a local area network (LAN), a wide area network (WAN) such as the Internet, a mobile network, any other network type, or a combination thereof). Further, the network (102) may encompass various interconnected, network-enabled subcomponents (or systems) (e.g., switches, routers, gateways, etc.) that may facilitate communications between the aforementioned components. Moreover, the edge device (100), the VM group (104), the storage array (106), and the cache tracking data structure (108) may communicate with one another using any combination of wired and/or wireless communication protocols.

In one or more embodiments, the edge device (100) may be a physical device such as a personal computing system (e.g., a laptop, a cell phone, a tablet computer, a server, etc.) configured for hosting one or more workloads, or for providing a computing environment whereon workloads may be implemented. For example, the edge device (100) may be a computing system (e.g., 500, FIG. 5) as discussed below in more detail in FIG. 5. In one or more embodiments, the edge device (100) may include a user interface (e.g., a graphical user interface (GUI)) (not shown) that allows a user to interact with applications running on the edge device (100). In one or more embodiments, the edge device (100) includes the functionality to manage the operation of VMs of the VM group (104) and their respective models. In one or more embodiments, managing the operation of the VM group (104) includes provisioning one or more VMs, deploying models on the VMs, configuring resource allocation, and monitoring performance metrics. In one or more embodiments, a user may submit a prompt or inference request to a model on a VM of the VM group (104) via the GUI of the edge device (100), wherein the edge device (100) routes the request to an appropriate VM. Further, the edge device (100) may include functionality to perform at least a portion of the methods shown in FIGS. 2-4. One of ordinary skill in the art will appreciate that the edge device (100) may perform other functionalities without departing from the scope of the embodiments disclosed herein.

In one or more embodiments, the VM group (104) includes A-N VMs. In one or more embodiments, a VM refers to a software-based emulation of a physical computer system that runs an operating system and applications independently from the underlying hardware infrastructure. In one or more embodiments, each VM of the VM group (104)

includes the functionality to run A-N models. In one or more embodiments, the A-N models are deep-learning models. In one or more embodiments, deep-learning models include any deep-learning model known in the art or discovered in the future, including but not limited to neural networks. In one or more embodiments, a neural network refers to a system that learns patterns from training data by utilizing a number of layers, neurons (i.e., nodes), weights (i.e., learned values that during training that determine the strength of connections between neurons in the neural network), biases (i.e., values learned during training that help neurons make decisions), activation functions, propagation functions, etc., which are generally used to model how the human brain processes information. In one or more embodiments, the neural networks include but are not limited to convolutional neural networks (i.e., neural networks designed for processing grid-like data such as images) and recurrent neural networks (i.e., neural networks designed to process sequential data by maintaining a memory of past inputs). In one or more embodiments, the VMs include the functionality to run more than one type of model at a time. In one or more embodiments, the models include the functionality to generate I/O requests. In one or more embodiments, the VMs of the VM group (104) include the functionality to send the I/O requests to the storage array (106). In one or more embodiments, the I/O request includes information indicating a type of operation to be performed (e.g., read, write, etc.), the target of the operation (e.g., a logical block address (LBA)), and metadata associated with the request. In one or more embodiments, the metadata includes identifying information related to the origin of the I/O request, such as a VM-identifier (ID) (i.e., an ID of the VM that sent the I/O request) and a model ID (i.e., an ID of the model that generated the request). Further, the VM group (104) may include functionality to perform at least a portion of the methods shown in FIGS. 2-4. One of ordinary skill in the art will appreciate that the VM group (104) may perform other functionalities without departing from the scope of the embodiments disclosed herein.

In one or more embodiments, the storage array (116) includes the functionality to store data. In one or more embodiments, the storage array (106) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. In one or more embodiments, the storage array (106) includes the functionality to receive I/O requests from VMs of the VM group (104). In one or more embodiments, the I/O request is generated by a model running on the VMs. In one or more embodiments, the storage array (106) includes the functionality to extract VM-identifiers, IDs, model IDs, and LBAs from the I/O requests. In one or more embodiments, the storage array (106) includes the functionality to determine whether data requested in an I/O request is in a cache (not shown). In one or more embodiments, the cache is local to the storage array (106) or remote. In one or more embodiments, the storage array (106) includes the functionality to prefetch data for future I/O requests for a VM-model ID pair (i.e., a model that generated the I/O request and a VM that sent the I/O request) and store it in the cache. In one or more embodiments, the storage array (106) includes the functionality to determine when to begin and stop prefetching data for VM-model ID pairs using a cache tracking data structure (108). Further, the storage array (106) may include functionality to perform at least a portion of the methods shown in FIGS. 2-4 One of ordinary skill in the art will appreciate that the storage array (106) may perform other functionalities without departing from the scope of the embodiments disclosed herein.

In one or more embodiments, the cache tracking data structure (108) includes the functionality to maintain metadata about prefetched data stored in the cache, including source identifiers (i.e., model IDs, VM IDs, etc.), data block locations (i.e., LBAs), prefetch timestamps (i.e., when the data was prefetched), and access timestamps (i.e., when prefetched data was last accessed). In one or more embodiments, the cache tracking data structure (108) is implemented as a hash table, tree structure, or other suitable data organization method. Further, the cache tracking data structure (108) may include functionality to perform at least a portion of the methods shown in FIGS. 2-4 One of ordinary skill in the art will appreciate that the cache tracking data structure (108) may perform other functionalities without departing from the scope of the embodiments disclosed herein.

Figure 5:
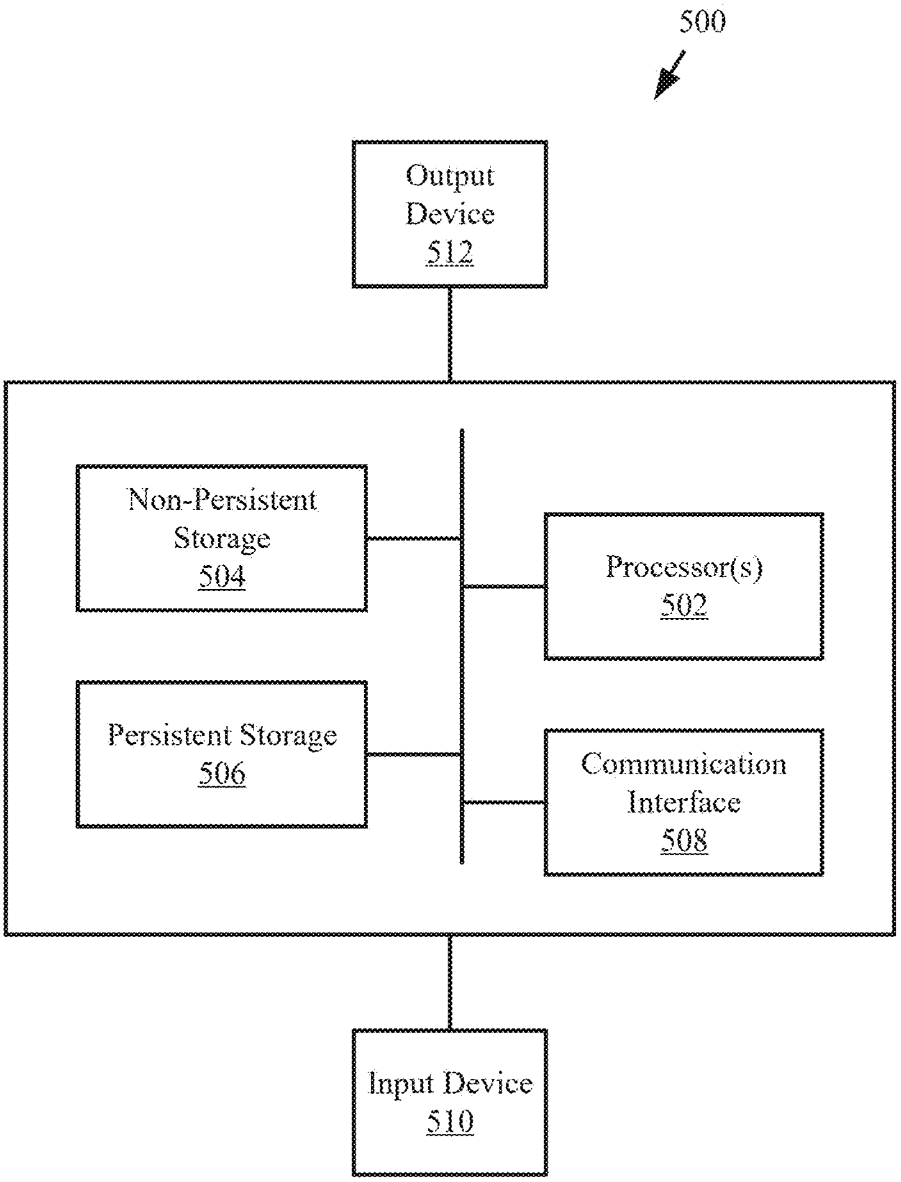
FIG. 5 shows a diagram of a computing system in accordance with one or more embodiments.

In one or more embodiments, the edge device (100), the VM group (104), the storage array (106), and the cache tracking data structure (108) are each implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the edge device (100), the VM group (104), the storage array (106), and the cache tracking data structure (108) described throughout this application.

In one or more embodiments, the edge device (100), the VM group (104), the storage array (106), and the cache tracking data structure (108) are each implemented as a logical device. The logical device may utilize the computing resources of any number of computing devices and thereby provide the functionality of the edge device (100), the VM group (104), the storage array (106), and the cache tracking data structure (108).

Figure 2:
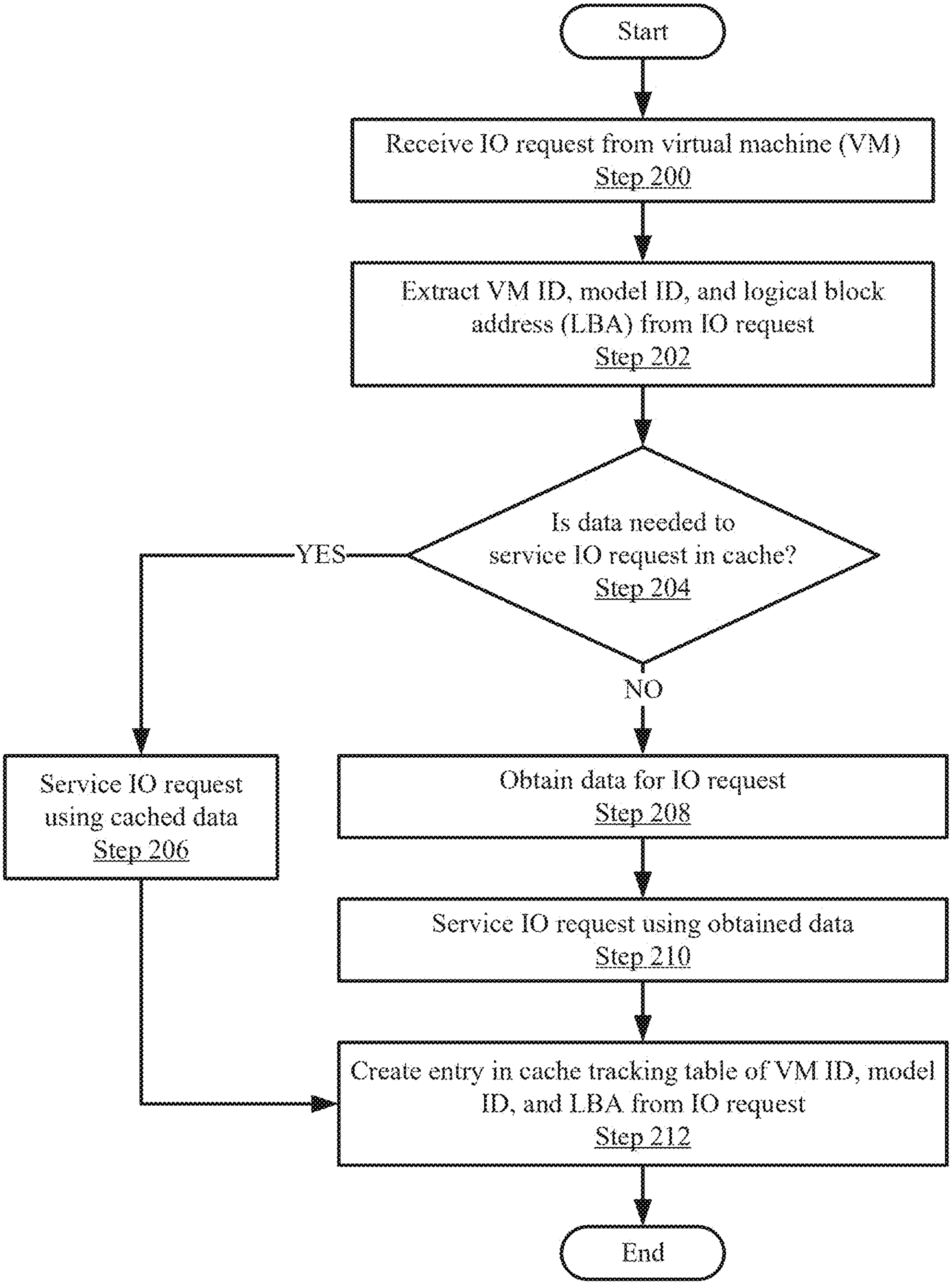
FIG. 2 shows a flowchart of a method for servicing I/O requests in accordance with one or more embodiments.

Turning to FIG. 2, FIG. 2 shows a flowchart of a method for servicing Input/Output (IO) requests and for establishing a system that can intelligently provide prefetching services as described in further detail below in FIG. 3 in accordance with one or more embodiments disclosed herein. The method may be performed by, for example, a storage array (e.g., 106 in FIG. 1). Other components in the system may perform this method without departing from the scope of the disclosure.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIGS. 2-4.

In step 200, the storage array receives an Input/Output (IO) request from a virtual machine (VM) of a VM group (e.g., 104 in FIG. 1). In one or more embodiments, the I/O request is generated by a model running on the VM. In one or more embodiments, the I/O request includes information indicating a type of operation to be performed (e.g., read, write, etc.), the target of the operation (e.g., a logical block address (LBA)), and metadata associated with the request. In one or more embodiments, the metadata includes identifying information related to the origin of the I/O request, such as a VM-ID (i.e., an ID of the VM that sent the I/O request) and a model ID (i.e., an ID of the model that generated the request). In one or more embodiments, more than one model is running on the VM. In one or more embodiments, the model is a deep learning model. In one or more embodiments, the storage array receives I/O requests from more than one VM of the VM group. In one or more embodiments, the storage array receives I/O requests generated from different models running on a single VM.

In step 202, the storage array extracts the VM-ID, the model ID, and the LBA from the I/O request. In one or more embodiments, the storage array extracts the VM-ID, the model ID, and the LBA from the I/O request by any means known in the art or discovered in the future. In one or more embodiments, each VM-ID and the model ID are referred to as a VM-ID-model ID pair.

In step 204, the storage array determines whether the data needed to service the I/O request is in a cache (not shown). In one or more embodiments, a cache refers to temporary storage that is easily accessible by the storage array. If the result is YES, the method proceeds to step 206. If the result is NO, the request proceeds to step 208. In one or more embodiments, the storage array determines whether the data needed to service the I/O request is in the cache by any means known in the art or discovered in the future.

As a result of the storage array determining that the data needed to service the I/O request is in a cache in step 204, the method arrives at step 206. In step 206, the storage array services the I/O request using the data in the cache. In one or more embodiments, servicing the I/O request refers to completing the read or write operation using the data found in the cache associated with the I/O request. In one or more embodiments, this includes verifying the request, retrieving the appropriate data from the cache, and completing the data transfer. In a non-limiting example, if the I/O request is a read operation requesting data from LBA 1000-1010, servicing the request involves retrieving the corresponding data blocks from the cache and returning them to the requesting VM. In one or more embodiments, the storage array services the I/O request by any means known in the art or discovered in the future. In one or more embodiments, the method proceeds to step 212 following step 206.

As a result of the storage array determining that the data needed to service the I/O request is not in a cache in step 204, the method arrives at step 208. In step 208, the storage array obtains data to service the I/O request. In one or more embodiments, the storage array obtains the data needed to service the I/O request from any storage media known in the art or discovered in the future, including but not limited to internal storage (i.e., storage local to the storage array), remote storage device (not shown), etc. In a non-limiting example, if the I/O request is a read operation requesting data from LBA 2000-2010 that is not cached, the storage array retrieves the data blocks from the storage media and returns them to the requesting VM. It should be appreciated, that obtaining data that is not in the cache requires more time and resources compared to retrieving cached data, as it involves accessing slower storage media and additional I/O operations. In one or more embodiments, the storage obtains the data needed to service the I/O request by any means known in the art or discovered in the future.

In step 210, the storage array services the I/O request using the obtained data. In one or more embodiments, the storage array services the I/O request using the obtained data by any means known in the art or discovered in the future.

In one or more embodiments, the method may arrive at step 212 following step 206 or step 210. In step 212, the storage array creates an entry in a cache tracking data structure (e.g., 108 in FIG. 1) including the VM-ID, the model ID, and the LBA associated with the I/O request. In one or more embodiments, the cache tracking data structure is used to track the cache to manage prefetching data for I/O requests, as described below in FIG. 3. In one or more embodiments, the storage array creates an entry in the cache tracking data structure by any means known in the art or discovered in the future.

Figure 3:
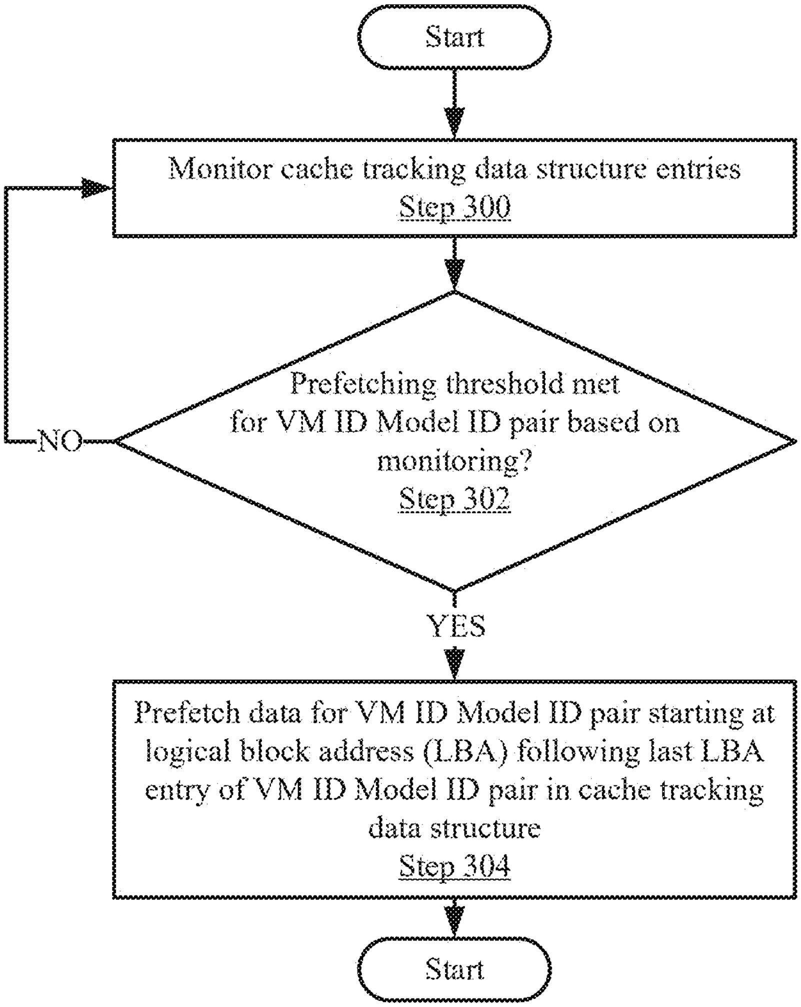
FIG. 3 shows a flowchart of a method for prefetching data for I/O requests in accordance with one or more embodiments.

Turning to FIG. 3, FIG. 3 shows a flowchart of a method for prefetching data for Input/Output (I/O) requests in accordance with one or more embodiments disclosed herein. The method may be performed by, for example, a storage array (e.g., 106 in FIG. 1). Other components in the system may perform this method without departing from the scope of the disclosure.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIGS. 2-4.

In step 300, the storage array monitors entries in a cache tracking data structure (e.g., 108 in FIG. 1). In one or more embodiments, the cache tracking data structure is the same cache tracking data structure as in FIG. 2. In one or more embodiments, the storage array monitors entries in the cache tracking data structure by any means known in the art or discovered in the future. In one or more embodiments, the cache tracking data structure maintains metadata about prefetched data stored in the cache, including source identifiers (i.e., model IDs, VM IDs, etc.), data block locations (i.e., LBAs), prefetch timestamps (i.e., when the data was prefetched), and access timestamps (i.e., when prefetched data was last accessed). In one or more embodiments, the storage array monitors the cache for prefetching opportunities. In one or more embodiments, prefetching opportunities refer to sequential I/O entries (i.e., I/O requests) in the cache tracking data structure from the same virtual machine (VM) and model (i.e., a VM-ID-model ID pair). It should be appreciated, that receiving I/O requests from the same VM-ID-model ID pair sequentially indicates that it is beneficial to prefetch data to service future I/O requests from that VM-ID-model ID pair, as they are likely to make similar requests in the future, as described below. In one or more embodiments, the storage array tracks entries in the cache tracking data structure for all VM-ID-model ID pairs sending I/O requests.

In step 302, the storage array determines whether a prefetching threshold is met (i.e., a prefetching opportunity) for the VM-ID-model ID pair. In one or more embodiments, the prefetching threshold is met when a predetermined sequence of I/O requests originating from the same location (i.e., a VM-ID-model ID pair) is received by the storage array. A non-limiting example of a prefetching threshold may be requiring three consecutive I/O requests from the same VM-ID-model ID pair, receiving more than six out of every ten requests from the same VM-ID-model ID pair, etc. In one or more embodiments, the prefetching threshold is determined by a user. In one or more embodiments, the prefetching threshold may be determined by any means known in the art or discovered in the future. It should be appreciated, that the prefetching threshold serves as an indicator that it would be beneficial to prefetch data for anticipated I/O requests (i.e., a prefetching opportunity). It should be appreciated, that receiving frequent I/O requests from various VM-ID-model ID pairs indicates that it is beneficial to prefetch data for these pairs, as they are likely to continue making similar requests in the future. If the result is YES, then the method proceeds to step 304. If the result is NO, then the method returns to step 300. In one or more embodiments, the method cycles between steps 300-302 until the prefetching threshold is met.

In step 304, the storage array prefetches data for the VM-ID-model ID pair starting at an LBA following the last LBA entry of the VM-ID-model ID pair in the cache tracking data structure. In one or more embodiments, the prefetched data is stored in the cache and labeled with its associated VM-ID and model ID. In a non-limiting example, if the last LBA entry of the VM-ID-model ID pair in the cache tracking data structure was "LBA 5", then the storage array would prefetch data starting at "LBA 6". In one or more embodiments, the data is prefetched in a sequential order of LBAs (e.g., LBA 1, LBA 2, LBA 3, etc.). In one or more embodiments, the LBAs of the prefetched data are stored in the cache tracking data structure. In one or more embodiments, the amount of data that is prefetched is dependent on user preference. In one or more embodiments, every time data is prefetched for the same VM-ID-model-ID pair, more data is prefetched. It should be appreciated that this is based on successful prefetch operations that indicate favorable access patterns, thereby justifying increased prefetch quantities to optimize future I/O performance. In one or more embodiments, the storage array prefetches data for the VM-ID-model ID pair by any means known in the art or discovered in the future. It should be appreciated that prefetching enhances system efficiency by improving data placement and reducing time and processing resources that would be required for multiple individual data retrievals to service multiple I/O requests, by consolidating them into a single prefetch operation.

In one or more embodiments, the method ends following step 304.

Figure 4:
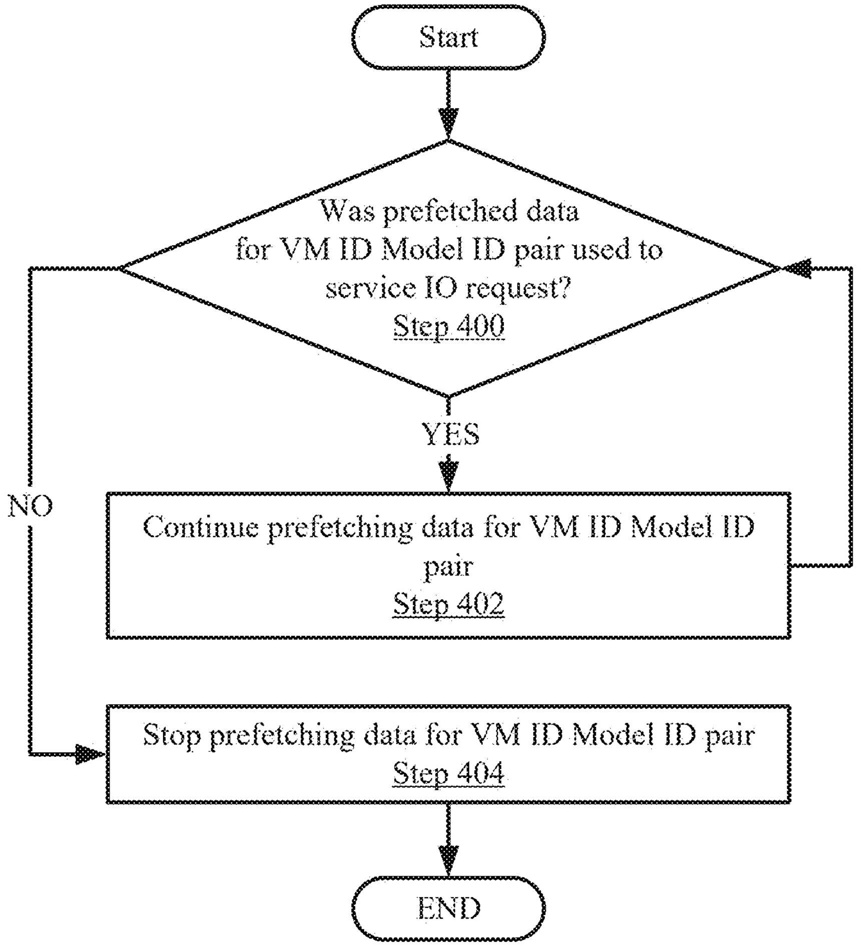
FIG. 4 shows a flowchart of a method for managing a cache tracking data structure in accordance with one or more embodiments

Turning to FIG. 4, FIG. 4 shows a flowchart of a method for managing a cache tracking data structure (e.g., 108 in FIG. 1) in accordance with one or more embodiments disclosed herein. The method may be performed by, for example, a storage array (e.g., 106 in FIG. 1). Other components in the system may perform this method without departing from the scope of the disclosure.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4 may be performed concurrently with one or more steps in FIGS. 2-4.

In step 400, the storage array determines if prefetched data for a VM-ID-model ID pair was used to service a threshold amount of Input/Output (I/O) requests (i.e., an I/O threshold). In one or more embodiments, the prefetched data is the same prefetched data as in FIG. 3. In one or more embodiments, the storage array makes this determination for each VM-ID-model ID pair for which it is prefetching data by monitoring the cache tracking data structure. In one or more embodiments, the cache tracking data structure is the same cache tracking data structure as in FIG. 3. In one or more embodiments, the determination is made after a predetermined period has elapsed following the storing of the prefetched data for each VM-ID-model ID pair in the cache. In one or more embodiments, the cache is the same cache as in FIG. 3. In one or more embodiments, the predetermined period is determined by a user. In one or more embodiments, the predetermined period is determined by any means known in the art or discovered in the future. It should be appreciated, that this determination is valuable because it informs the storage array whether the prefetched data for specific VM-ID-model ID pairs is being utilized, and it should continue prefetching, or if it is not being utilized, and it should stop prefetching. In one or more embodiments, the number of blocks of data per sequence of prefetched data that are used to service I/O requests, which is needed to be sufficient to continue prefetching for a particular VM-ID-model ID pair (i.e., the I/O threshold), varies based on user preference. In one or more embodiments, the I/O threshold is determined based on specific system requirements, performance objectives, or operational policies. In a non-limiting example, the I/O threshold is exceeded when one or more blocks of data are used in a sequence of prefetched data. In one or more embodiments, the I/O threshold may be set higher, requiring multiple blocks or a certain percentage of the prefetched sequence to be accessed before determining to continue prefetching. In one or more embodiments, the storage array determines if prefetched data for a VM-ID-model ID pair was used to service at least one I/O request by any means known in the art or discovered in the future. If the result is YES, the method proceeds to step 402. If the result is NO, the method proceeds to step 404.

As a result of the storage array determining that prefetched data for a VM-ID-model ID pair was used to service the threshold amount of I/O requests in step 400, the method arrives at step 402. In step 402, the storage array continues prefetching data for the VM-ID-model ID pair. In one or more embodiments, the storage array prefetches more data per prefetch operation for individual VM-ID-model ID pairs each time it determines to continue prefetching data for a specific VM-ID-model ID pair in step 402. In one or more embodiments, the storage array prefetches more data at an exponential rate. In one or more embodiments, the method cycles between steps 400 and 402 for each VM-ID-model ID pair until prefetched data is not used to service an I/O request, then the method proceeds to step 404.

In one or more embodiments, the continued prefetching process involves optimization techniques that leverage both historical performance data and real-time system analysis to maximize efficiency. In one or more embodiments, the storage array employs predictive algorithms that analyze historical lengths of prefetch streams to determine the optimal number of blocks of data to prefetch for each VM-ID-model ID pair, enabling the system to learn from past prefetching patterns and adjust future prefetch sizes accordingly. Further, in one or more embodiments, the storage array performs comprehensive device mapping analysis, considering both historical device mapping patterns and current system topology to determine the most advantageous prefetch storage location. Further, this analysis evaluates the optimal storage location for prefetched data, determining whether it should be stored in local emulation or remote emulation environments and whether it should be placed in local dynamic random-access memory (DRAM) for frequently accessed data by specific VM instances, or in global DRAM, based on factors such as network latency, bandwidth availability, and current system load distribution.

As a result of the storage array determining that prefetched data for a VM-ID-model ID pair was not used to service at least one I/O request in step 400, the method arrives at step 404. In step 404, the storage array stops pre-fetched data for the VM-ID-model ID pair whose prefetched data was not used to service the threshold amount of I/O requests. In one or more embodiments, the storage array clears the cache tracking data structure entries of the VM-ID-model ID pair. It should be appreciated, that the storage array will begin prefetching data for the VM-ID-model ID pair again if it meets a prefetching threshold described above in FIG. 3. It should be appreciated, that halting perfecting for VM-ID-model ID pair whose prefetched data was not used to service any I/O requests is beneficial because it saves storage space, time, and processing power that would be used prefetching data that isn't likely to be used to service I/O request.

In one or more embodiments, the method ends following step 404.

Embodiments of the disclosure may be implemented using computing devices. Turning to FIG. 5, FIG. 5 shows a diagram of a computing device (500) in accordance with one or more embodiments. The computing device (500) may include one or more computer processor(s) (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), input devices (510), output devices (512), and numerous other elements (not shown) and functionalities. Each of these components is described below.

In one embodiment, the computer processor(s) (502) may be an integrated circuit for processing instructions. For example, the computer processor(s) (502) may be one or more cores or micro-cores of a processor. The computing device (500) may also include one or more input devices (510), such as a touchscreen, access keyboard, mouse, microphone, touchpad, electronic pen, or any other type of input device. The communication interface (508) may include an integrated circuit for connecting the computing device (500) to a network (e.g., 102 in FIG. 1) (e.g., a local area network (LAN), a wide area network (WAN) such as the Internet, mobile network, or any other type of network) and/or to another device, such as another computing device.

In one embodiment, the computing device (500) may include one or more output devices (512), such as a screen (e.g., a liquid crystal display (LCD), a plasma display, touchscreen, cathode ray tube (CRT) monitor, projector, or other display device), a printer, external storage, or any other output device. One or more of the output devices (512) may be the same or different from the input devices (510). The input and output device(s) (510, 512) may be locally or remotely connected to the computer processor(s) (602), non-persistent storage (504), and persistent storage (506). Many diverse types of computing devices exist, and the aforementioned input and output device(s) (510, 512) may take other forms.

The problems discussed above should be understood as being examples of problems solved by embodiments of the disclosure, and the disclosure should not be limited to solving the same/similar problems. The disclosed disclosure is broadly applicable to address a range of problems beyond those discussed herein.

In the detailed description of the embodiments of the disclosure above, numerous specific details are set forth in order to provide a more thorough understanding of one or more embodiments of the disclosure. However, it will be apparent to one of ordinary skill in the art that the one or more embodiments of the disclosure may be practiced without these specific details. In other instances, well-known features have not been described in detail to avoid unnecessarily complicating the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connection between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage module, a diskette, a tape, flash memory, physical memory, or any other physical computer readable storage medium. Specifically, the software instructions may correspond to computer readable program code that, when executed by a processor(s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims below.

What is claimed is:

1. A method for prefetching data for Input/Output (IO) requests, the method comprising:

receiving a first I/O request from a virtual machine (VM);

extracting a first VM-Identifier (ID) and a first model ID from the first I/O request to obtain a first VM-ID-model ID pair, wherein the first model ID is associated with a first model hosted on the VM;

making a first determination, in response to extracting the first VM-ID and the first model ID, that data needed to service the first I/O request is not in a cache;

obtaining, in response to the first determination, the data needed to service the first I/O request, wherein the data is associated with a logical block address (LBA);

servicing, in response to the obtaining, the first I/O request using the obtained data;

creating, in response to servicing the first I/O request, a first entry in a cache tracking data structure, wherein the first entry specifies the first VM-ID, the first model ID, and the LBA;

making a second determination, based on the first entry, that a prefetching threshold is met for the first VM-ID-model ID pair;

prefetching, in response the second determination, data starting at an LBA following the LBA to obtain perfected data;

storing the prefetched data in the cache; and creating, in response to the storing, a second entry in the cache tracking data structure comprising of each LBA of the prefetched data.

2. The method of claim 1, wherein the data is prefetched in a sequential order of LBAs.

3. The method of claim 1, wherein the first I/O request is generated by the first model hosted on the VM.

4. The method of claim 1, further comprising:

receiving a second I/O request from the VM;

making a third determination that data needed to service the second I/O request is in the cache; and servicing, in response to the third determination, the second I/O request using the data in the cache.

5. The method of claim 4, further comprising:

making a fourth determination that the prefetched data for the first VM-ID-model ID pair was used to service the second I/O request; and prefetching, in response to the fourth determination, second perfected data for the first VM-ID model-ID pair starting at an LBA following a last LBA of the second entry in the cache tracking data structure.

6. The method of claim 1, further comprising:

after storing the prefetched data, making a third determination, that the prefetched data for the first VM-ID-model ID pair was not used to service any I/O requests; and removing, in response to the third determination, entries in the cache tracking data structure associated with the first VM-ID-model ID pair.

7. The method of claim 6, wherein the third determination is made after a period of time has elapsed following the storing of the prefetched data.

8. The method of claim 1, further comprising:

receiving a second I/O request from a second VM;

extracting a second VM-ID and a second model ID from the second I/O request to obtain a second VM-ID-model ID pair, wherein the second model ID is associated with a second model hosted on the VM;

making a third determination that data needed to service the second I/O request is not the cache; and obtaining, in response to the third determination, second data needed to service the second I/O request, wherein the data to service the second I/O request is associated with a second LBA;

servicing, in response to the obtaining, the second I/O request using the obtained second data;

creating, in response to servicing the second I/O request, a second entry in the cache tracking data structure, wherein the second entry specifies the second VM-ID, the second model ID, and the second LBA;

making a second determination, based on the first entry, that a prefetching threshold is met for the second VM-ID-model ID pair;

prefetching, in response the second determination, second data starting at an LBA following the second LBA to obtain second prefetched data;

storing the second prefetched data in the cache; and creating, in response to the storing, a third entry in the cache tracking data structure comprising of each LBA of the second prefetched data.

9. The method of claim 1, wherein the model is a deep learning model.

10. A non-transitory computer readable medium (CRM) comprising computer readable program code, which when executed by a computer processor, enables the computer to perform a method for prefetching data for Input/Output (IO) requests, the method comprising:

receiving a first I/O request from a virtual machine (VM);

extracting a first VM-Identifier (ID) and a first model ID from the first I/O request to obtain a first VM-ID-model ID pair, wherein the first model ID is associated with a first model hosted on the VM;

making a first determination, in response to extracting the first VM-ID and the first model ID, that data needed to service the first I/O request is not in a cache;

obtaining, in response to the first determination, the data needed to service the first I/O request, wherein the data is associated with a logical block address (LBA);

servicing, in response to the obtaining, the first I/O request using the obtained data;

creating, in response to servicing the first I/O request, a first entry in a cache tracking data structure, wherein the first entry specifies the first VM-ID, the first model ID, and the LBA;

making a second determination, based on the first entry, that a prefetching threshold is met for the first VM-ID-model ID pair;

prefetching, in response the second determination, data starting at an LBA following the LBA to obtain perfected data;

storing the prefetched data in the cache; and creating, in response to the storing, a second entry in the cache tracking data structure comprising of each LBA of the prefetched data.

11. The non-transitory CRM of claim 10, wherein the data is prefetched in a sequential order of LBAs.

12. The non-transitory CRM of claim 10, wherein the first I/O request is generated by the first model hosted on the VM.

13. The non-transitory CRM of claim 10, further comprising:

receiving a second I/O request from the VM;

making a third determination that data needed to service the second I/O request is in the cache; and servicing, in response to the third determination, the second I/O request using the data in the cache.

14. The non-transitory CRM of claim 13, further comprising:

making a fourth determination that the prefetched data for the first VM-ID-model ID pair was used to service the second I/O request; and prefetching, in response to the fourth determination, second perfected data for the first VM-ID model-ID pair starting at an LBA following a last LBA of the second entry in the cache tracking data structure.

15. The non-transitory CRM of claim 10, further comprising:

after storing the prefetched data, making a third determination, that the prefetched data for the first VM-ID-model ID pair was not used to service any I/O requests; and removing, in response to the third determination, entries in the cache tracking data structure associated with the first VM-ID-model ID pair.

16. The non-transitory CRM of claim 15, wherein the third determination is made after a period of time has elapsed following the storing of the prefetched data.

17. A system prefetching data for Input/Output (IO) requests, the system comprising:

persistent storage; and a computing device, comprising a processor and memory, programmed to:

receive a first I/O request from a virtual machine (VM);

extract a first VM-Identifier (ID) and a first model ID from the first I/O request to obtain a first VM-ID-model ID pair, wherein the first model ID is associated with a first model hosted on the VM;

make a first determination, in response to extracting the first VM-ID and the first model ID, that data needed to service the first I/O request is not in a cache;

obtain, in response to the first determination, the data needed to service the first I/O request, wherein the data is associated with a logical block address (LBA);

service, in response to the obtaining, the first I/O request using the obtained data;

create, in response to servicing the first I/O request, a first entry in a cache tracking data structure, wherein the first entry specifies the first VM-ID, the first model ID, and the LBA;

make a second determination, based on the first entry, that a prefetching threshold is met for the first VM-ID-model ID pair;

prefetch, in response the second determination, data starting at an LBA following the LBA to obtain perfected data;

store the prefetched data in the cache; and create, in response to the storing, a second entry in the cache tracking data structure comprising of each LBA of the prefetched data.

18. The system of claim 17, where in the computing device is further programed to:

receive a second I/O request from the VM;

make a third determination that data needed to service the second I/O request is in the cache;

service, in response to the third determination, the second I/O request using the data in the cache;

make a fourth determination that the prefetched data for the first VM-ID-model ID pair was used to service the second I/O request; and prefetch, in response to the fourth determination, second perfected data for the first VM-ID model-ID pair starting at an LBA following a last LBA of the second entry in the cache tracking data structure.

19. The system of claim 17, wherein the computing device is further programmed to:

after storing the prefetched data, make a third determination, that the prefetched data for the first VM-ID-model ID pair was not used to service any I/O requests; and remove, in response to the third determination, entries in the cache tracking data structure associated with the first VM-ID-model ID pair.

20. The system of claim 19, wherein the third determination is made after a period of time has elapsed following the storing of the prefetched data.

* * * * *